L. A. LARSON.
NUMBER AND LAMP BOX.
APPLICATION FILED AUG. 13, 1914.
1,166,608.
Patented Jan. 4, 1916.
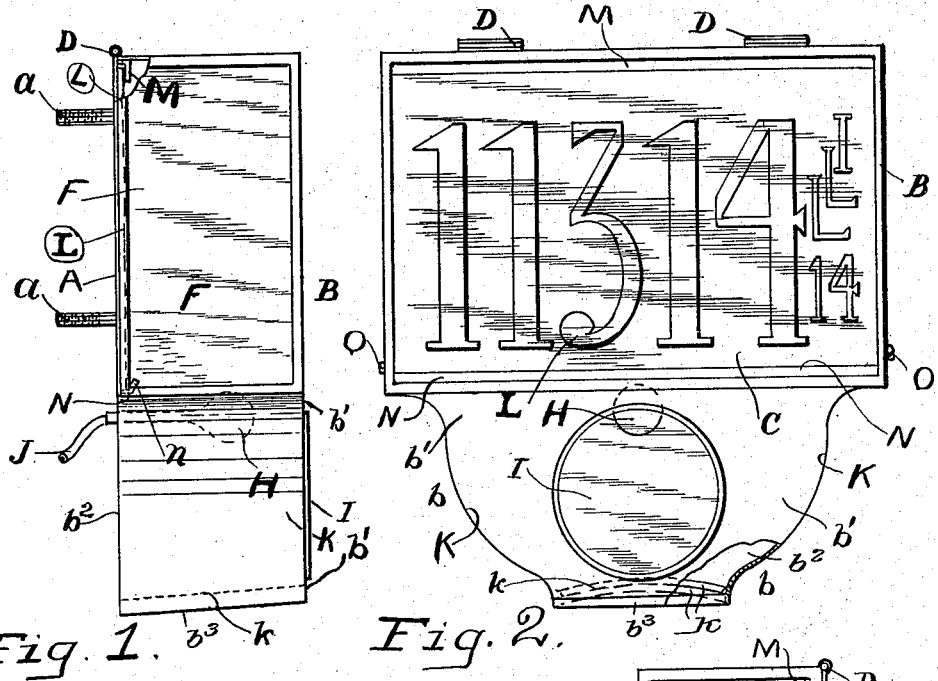
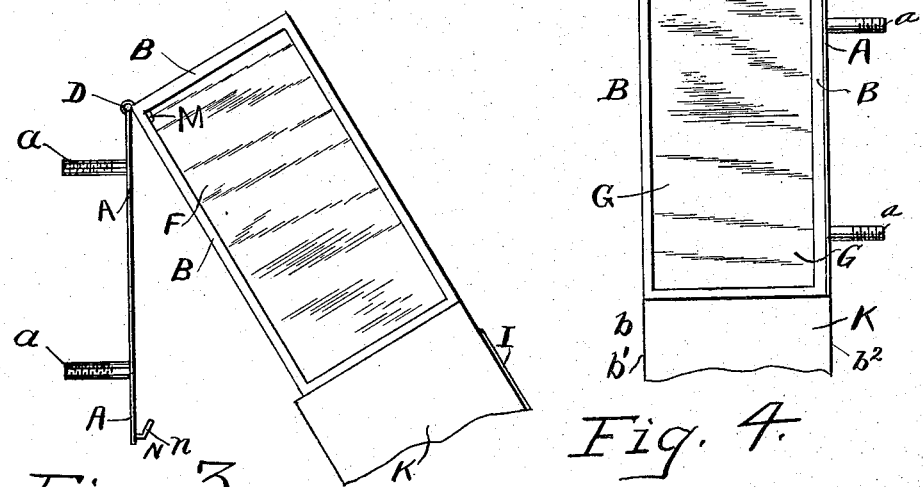
Witnesses:
Charles B. H. Brown
E. A. Winchell
Lars A. Larson,
Inventor,
By Charles Turner Brown,
Atty.

UNITED STATES PATENT OFFICE.

LARS A. LARSON, OF ELGIN, ILLINOIS.

NUMBER AND LAMP BOX.

1,166,608. Specification of Letters Patent. Patented Jan. 4, 1916.

Application filed August 13, 1914. Serial No. 856,613.

*To all whom it may concern:*

Be it known that I, LARS A. LARSON, a citizen of the United States, residing at Elgin, in the county of Kane and State of Illinois, have invented certain new and useful Improvements in Number and Lamp Boxes, of which the following is a specification.

My invention relates to a box in which the license number required of automobile owners may be displayed, and a light so disposed as to illuminate the license number may be contained.

The object of this invention is to obtain a number and lamp box which is economically made; is durable; not liable to get out of order or become broken; which is easily opened to insert a license number and not liable to become opened to permit said number to become displaced or lost.

An additional, and essential object is to obtain a device of the kind named which will so light up the face of the plate containing said license numbers that the same can be read when the lamp, which is also contained in said device, is lighted.

Additional objects are set forth in the specification.

In the drawings accompanying and forming a part of this specification Figure 1 is a side elevation of the device embodying the invention, with the device closed. Fig. 2 is a front elevation of said device. Fig. 3 is a side elevation of the side illustrated in Fig. 1, with the device opened, to permit a license number plate to be placed therein. And Fig. 4 is a side elevation of the device, showing the opposite side to the one which is illustrated in Figs. 1 and 2, with the device closed.

A reference letter applied to designate a given part indicates said part throughout the several figures, wherever the same appears.

A is the base of the device and $a$, $a$, are screw threaded bolts, or studs, secured to said base. Studs $a$ are used to attach the device to an automobile or other vehicle.

B is a box frame, provided with the clear glass front C, and hinged to base A by hinges D.

F is a glass plate secured in one end of box frame B, and G is a like glass plate secured in the other end of said box frame. Plates F and G, are made of colored glass, say green and yellow, and are illumined by lamp H.

I is a plate of colored glass, say red, and is secured in position in the front of part $h$ of box frame B. Lamp H is secured in place in said part $b$ of the box frame, and is provided with the electric cable J, and said lamp is lighted in the ordinary way of lighting electric lamps by connecting the wires of said cable to a battery and closing the circuit.

K, K, are curved sides to part $b$ of the box frame B, and are arranged to act as deflectors of rays from the lamp H, reflecting said rays and directing them on to the plates F and G, respectively.

$k$ is a reflector positioned on the bottom of part $b$ of said box frame B, and is adapted to reflect and direct rays from lamp H on to the face of a number plate (L), when said number plate is positioned against base A, and directly in front thereof, (within the box frame B).

M is a flange or rib attached to the top side of box frame A, on the under side of said top, and is positioned so as to come in front of number plate L to maintain the upper edge of said number plate in position against base A; and N is a rib which extends longitudinally along on base A, near the lower edge thereof, forming a shelf on which number plate L is placed. The free edge of rib N is turned up, as at $n$, to hold said number plate against the inner face of base A, when the device is closed.

O are abutments on the sides of base A, which come in frictional contact with the sides of box frame B, when the device is closed, tending to prevent the lower side and bottom of said box frame from moving away from said base when the automobile is in motion on a street, road or highway. Part $b$ of the box frame B is provided with front $b^1$, in which the round sheet of glass I is secured with a like back ($b^2$); except that back $b^2$ is not provided with a glass therein, and with bottom $b^3$.

It will be observed, (see Fig. 2), that the edge of reflector $k$ which is adjacent to the back $b^2$ is in a lower plane than is the edge thereof which is adjacent to front $b^1$ of part $b$ of the box frame B. The purpose of this is to deflect rays of light from lamp H on to the front of number plate L.

To use the device base A is attached to the back or rear end of an automobile or other vehicle, so that said base is in a subtantially vertical plane. Box frame B is then turned in, to the position thereof which is illustrated in Fig. 3, or nearly so, a number plate is placed on rib or shelf N and said box frame is returned to the position thereof which is illustrated in Figs. 1 and 4. Rib M will then retain said number plate in position. Cable J is connected to a suitable source of electric supply and the circuit is closed. Lamp H will thereby be lighted, and the light therefrom will be directed on to the face of said number plate and on to the several plates of glass, (F, G and I).

I claim:—

1. A number and lamp box, comprising an upright base, a box frame, means to pivotally attach the upper side of said box frame to the upper edge of said base, a flange extending longitudinally along the upper side of said box frame and a flange extending longitudinally along the inner face of said base, adjacent to the lower edge thereof, a number plate on said last named flange, said first named flange adapted to hold the upper edge of said number plate in a determined position when said box frame is closed against said base, colored glass secured in the sides of said box frame, and in the front of the lower part thereof.

2. A number plate and lamp box comprising an upright base, a box frame, hinges pivotally attaching the one side of said box frame to the corresponding edge of said base, said box frame provided with a clear glass front in the part thereof before said base and adjacent to said attached edge, and with a sheet of colored glass in the remaining part of said front, reflectors in the sides and bottom of said remaining part of said box frame, a lamp in said remaining part, and flanges respectively positioned on the front of said base, near the edge thereof opposite said hinges, and on the inner face of the hinged side of said box frame, adjacent to the edge thereof which rests against said base.

L. A. LARSON.

In the presence of—
 GEO. F. STEWART,
 FRED G. STEWART.

Copies of this patent may be obtained for five cents each, by addressing the "Commissioner of Patents, Washington, D. C."